United States Patent [19]

Lemelson et al.

[11] Patent Number: 4,485,400

[45] Date of Patent: Nov. 27, 1984

[54] VIDEO TELEPHONE

[76] Inventors: Jerome H. Lemelson, 85 Rector St., Metuchen, N.J. 08840; Christian Grund, 707 L Eagle Heights, Madison, Wis. 53705

[21] Appl. No.: 379,963

[22] Filed: May 19, 1982

Related U.S. Application Data

[63] Continuation-in-part of Ser. No. 224,503, Jan. 13, 1981, abandoned.

[51] Int. Cl.³ ............................................. H04N 7/18
[52] U.S. Cl. .................... 358/85; 179/2 C; 179/2 DP; 179/2 TV; 179/6.2; 358/140; 358/229; 358/254; 360/9.1; 360/33.1; D14/54; D14/57; D14/78; D14/79
[58] Field of Search ................ 358/85, 229, 254, 140; 360/9.1, 33.1; 179/2 C, 2 TV, 2 DP, 1 C, 1 HF, 6.2; D14/54, 57, 78, 79

[56] References Cited

U.S. PATENT DOCUMENTS

| | | | |
|---|---|---|---|
| 3,617,626 | 11/1971 | Bluth | 358/311 |
| 3,974,329 | 8/1976 | Zenzefilis | 360/9.1 |
| 4,057,836 | 11/1977 | Munsey | 358/140 |
| 4,099,202 | 7/1978 | Cavanaugh | 358/85 |
| 4,196,447 | 4/1980 | Dalke | 358/140 |
| 4,216,499 | 8/1980 | Kunze | 358/140 |

OTHER PUBLICATIONS

*IBM Technical Disclosure Bulletin*, vol. 10, No. 7, Dec. 1967, p. 904, "TV Buffer", W. K. French.
*Conference Record: Electronic Text Communication,* Munich, Jun. 12–15, 1978, pp. 323–329, "Display Phone".
*Fernmelde-Praxis*, (Germany), vol. 56, No. 24, (Dec. 25, 1979), "Function of Subscriber Installations for the View Text Data".

*Primary Examiner*—Howard W. Britton

[57] ABSTRACT

An apparatus and method are provided for transmitting video data over telephone lines. The apparatus is particularly applicable for transmitting and receiving images of persons speaking to each other. In one form, a portable self-contained unit is provided at each end of a conventional telephone circuit wherein the transducers of the mouthpiece and earpiece of each telephone are respectively acoustically coupled to respective acoustic output and input electrical-to-sound and sound-to-electrical transducers of each self-contained unit for two-way audio and video communication therebetween. Each unit, which may be contained in a single housing, has a television camera directed and operative for slow scanning the face of a person making the telephone call, a television display screen and image retaining means for displaying the image of a person having a similar unit at the other end of the line, and a speaker and microphone which may be contained within the housing or in a telephone hand set for receiving speech and generating sounds of speech transmitted from the other terminal circuits. Hard copy generating means, such as a picture printer, may also be provided to print pictures of the images on the television display screen when controlled to do so.

4 Claims, 9 Drawing Figures

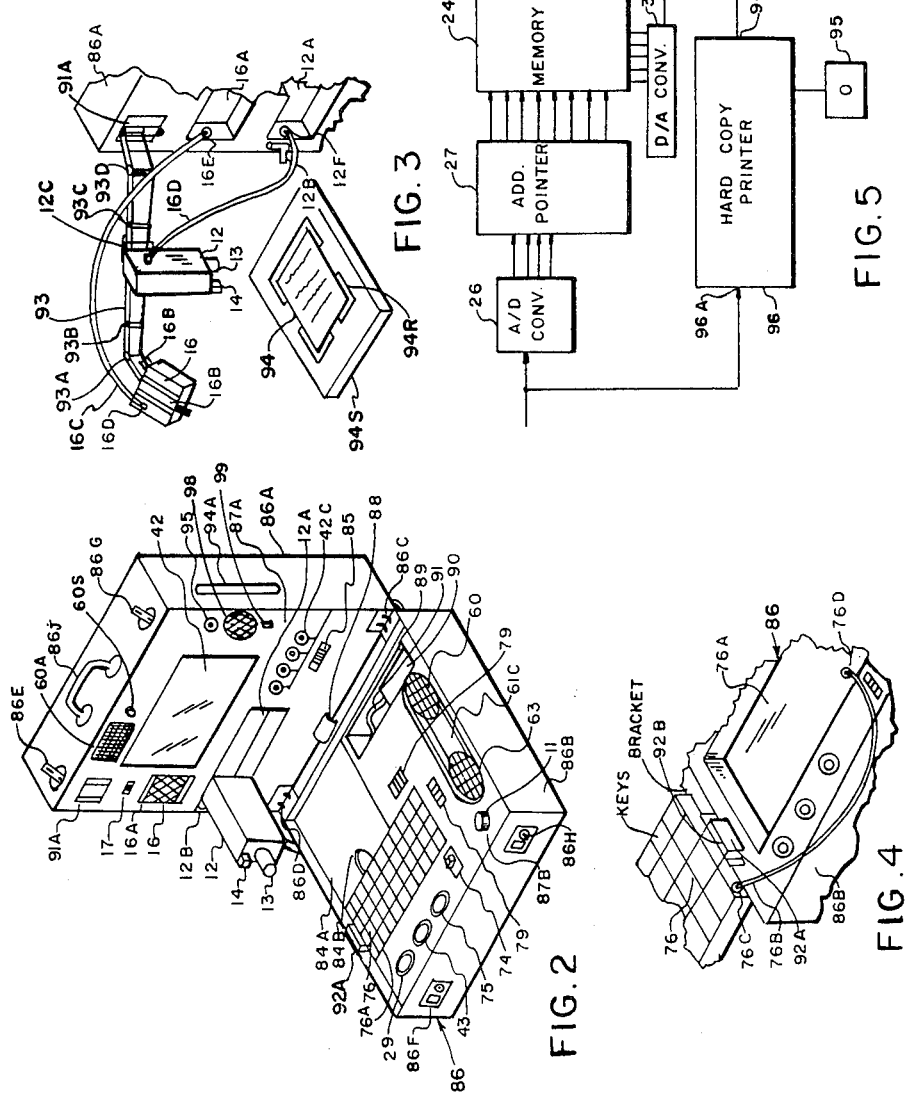

VIDEO TELEPHONE

RELATED APPLICATIONS

This is a continuation in part of Ser. No. 224,503 filed 1/13/81, now abandoned.

This invention relates to a communication system and in particular to a composite communication system in which voice, alpha-numeric code and picture data may be simultaneously generated and automatically transmitted on telephone lines.

It is known in the art to generate both voice and video information at a common terminal, such as a telephone terminal, and to transmit same on the connected line to another terminal where the voice information is heard by a person at the other terminal and the video information is generated as a still image on the display screen of a cathode ray tube. Generally the transmission of video or facsimile information is effected by means of a television camera requiring a cable transmission line or slow scanning is effected without interference from signals generated by speaking into the telephone. A signal processing system is employed which includes a memory and a multiplexing or computer controlled switching arrangement for generating digital speech signals and video signals from such memory, which signals are converted to telephone line transmittable signals which are multiplexed on the connected line in a manner to provide the speech information in real time at the receiving telephone and the video information in a memory thereat whereby the time to transmit such video information is near real time and a picture may be generated, if required, at the receiving terminal in a minimum of time.

Accordingly it is a primary object of this invention to provide a new and improved system and method for generating and transmitting video information and one or more additional forms of information on a common telephone line.

Another object is to provide a video telephone capable of simultaneously or sequentially transmitting both video and voice information on a common connected line.

Another object is to provide a portable communication device which is capable of being operated at any telephone terminal circuit without the necessity of extensive installation, for transmitting both picture and voice information on any circuit of the telephone system.

Another object is to provide a communication system for automatically transmitting a plurality of types of information including video information on telephone lines between terminal circuits of an automatic telephone switching system wherein the video information is automatically processed and transmitted in a manner permitting another type of information to be transmitted without noticeable interruption.

Another object is to provide an automatic communication system for video, facsimile and data transission and recording which employs portable data terminals.

Another object is to provide a video telephone system and method of communicating picture and speech data on voice wires which system does not require modifications to telephone terminals or special wiring for its use.

Another object is to provide a new and improved portable communication device for communicating speech, video and alphanumeric data.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 2 is an isometric view of a portable unit forming part of the system defined in FIG. 1.

FIG. 3 is a partial isometric view of a modified form of the portable unit shown in FIG. 2.

FIG. 4 is a partial isometric view of a portion of the unit of FIG. 2 in an open and operable condition.

FIG. 5 is a schematic diagram of a hard copy printing sub-system associated with the system shown in FIG. 1.

Figure 1:
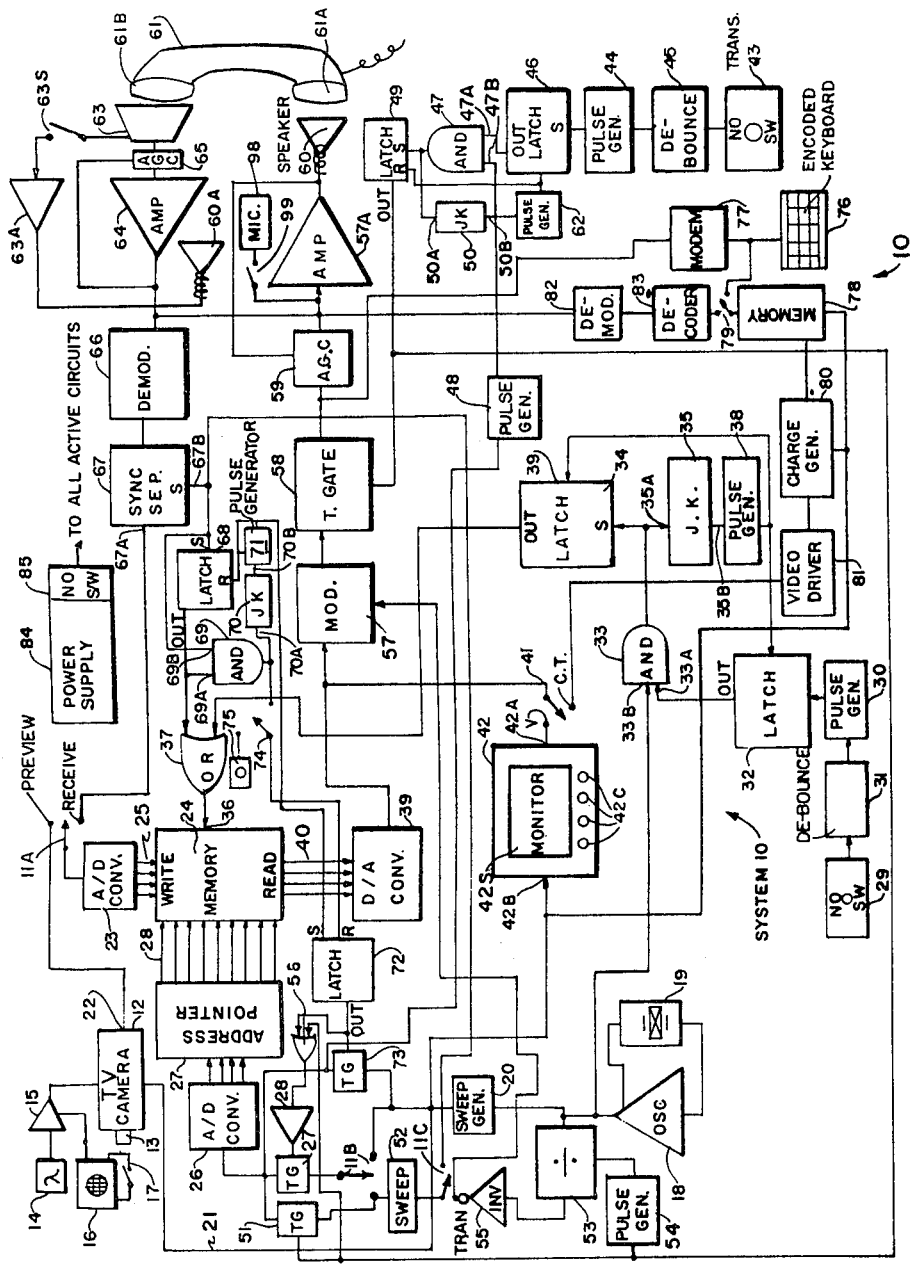
FIG. 1 is a schematic diagram of electronic and other components of a portable two way communication system for video and audio information transmittable on conventional telephone lines.

FIG. 1 illustrates a portable electronic communication device 10 which is electrically powered by a suitable power supply 84, such as a rechargeable battery, which supplies electrical energy for the various components of the system through a plurality of manually operated switches. The communication device 10 includes a television camera 12 having a lens 13 for scanning an image field, such as an image of a person located at the device and who is seeking to communicate with another person in the system by means of one or more telephone line communication channels. Control means is provided in the form of a photoelectric sensor 14, the output of which is connected to an amplifier and control circuit 15 for compensating for the ambient light level presented to the camera 12. A supplemental light source 16, such as a small photo flood lamp or other suitable lamp, may also be automatically controlled to eliminate one or more subjects in the field scanned by the camera in the event that the ambient light level falls below an acceptable level in order for the camera 12 to properly operate. The light source 16 may also be manually controlled through a manual switch 17.

Signals for controlling the read-beam of the camera 12 are initially generated by a sync oscillator 18 which, in the embodiment illustrated, is a crystal oscillator controlled by means of a suitable crystal to achieve the accuracy and stability necessary for proper camera operation. Such crystal provides the necessary synchronization pulses to a sweep generator 20 which produces on its output a suitable waveform which it presents to the synchronization-deflection control circuits of the camera through an input 21 extending to the camera. The video signals representing the image to be transmitted, pass through a video output 22 of the camera 12 through a switch 11A to an analog-to-digital converter 23 in which said signals are converted to digital codes representing the color and brightness levels of the image scanned by the camera 12. The coded output of the converter 23 is presented to a memory 24 through a memory Write-input port 25.

The sweep generator 20 is also connected to an analog-to-digital converter 26 through a switch 11B and a transmission gate 27, which gate is held by an inverter 28. Analog-to-digital converter 26 generates a digital code on its output, which code is a series of signals representing a sweep signal voltage, and such signals are passed to an address pointer 27 which determines the code of the particular sequential word position in the memory 24 and represents the particular pixel being scanned by camera 12, the color and brightness signals of which are simultaneously presented to the analog-to-digital converter 23. The code so generated is transmitted to the memory 24 through input ports 28.

A depression of a normally open momentary contact switch 29 causing it to close, results in the activation of a pulse generator 30 thru a debounce circuit 31, which provides a single setting pulse to a latch 32 each time the switch 29 is closed. Latch 32 activates an input 33A of an AND gate 33 having a second input 33B which is activated upon receipt of the next sync pulse which indicates the beginning of an new full-frame scanning sweep controlled by sync oscillator 18, the output of which transfers the pulse to the set input S of a latch 34 and also activates a clock input 35A of a JK flip-flop switch 35. The Q output 35B of flip-flop 35 becomes inactive upon receipt of the first pulse by the flip-flop 35. The output of latch 34 is thereafter transferred to the write-enable input 36 of memory 24 through an OR gate 37, causing the memory 24 to "Write" the word presented at inputs 25 in the position of the memory as determined by the code generated on the address input 28 of the memory. This write or recording process continues sequentially through the memory until the next sync pulse generated by oscillator 18 is received by input 33B to the AND gate 33. Such second pulse is transferred to the clock input 35A of the flip-flop switch 35 through AND gate 33 and causes the flip-flop to toggle again. This causes the P output 35B to resume its initial state causing pulse generator 38 to generate a single short duration pulse which is applied to reset latches 32 and 34, thus deactivating the input 33A to the AND gate 33 and preventing the passage therethrough of subsequent sync pulses. The action also deactivates the OR gate 37 which controls the write enable input 36 of memory 24, thereby terminating the writing of new information in the memory. As the address pointer 27 scans memory 24, the information stored therein is sequentially presented to a digital-to-analog converter 39 through read inputs 40 of the memory 24 and is converted back to an analog video signal which represents the color and brightness levels of the pixels of the previously recorded field. The video signal, so generated, is then conducted through a switch 41 and video input port 42A to a video receiver-monitor 42, which, upon simultaneous receipt thereby of sweep signals from sweep generator 20 through sweep input 42B, displays the reconstructed recorded image field or scene which is recorded in memory 24 for monitoring or previewing and possible cancellation before its transmission. In other words, if the picture so generated is not acceptable and is unfavorable, it may be automatically cancelled by a second operation of the switch 29, after which a new picture signal may be generated by the camera and recorded as described.

If it is determined that the image recorded in the memory is acceptable for transmission, a normally open, momentary contact transmit switch 43 is manually closed. The closure of such switch 43 activates a pulse generator 44 through a switch debouncing circuit 45, which transfers a set pulse to a latch 46. The output of latch 46 is connected to activate an input 47A to an AND gate 47. The other input 47B to the AND gate 47, is activated by a pulse received from a pulse generator 48, which is operable to generate a pulse each time the input sweep control signal transmitted to analog-to-digital converter 26 initiates a new cycle, which indicates the beginning of a frame scanning sequence. When both inputs of the AND gate 47 are energized, a pulse is transmitted on the output of said gate to the set input S of a latch 49 and also to the clock input 50A of a JK flip-flop 50, forcing its Q output 50B to be deactivated. The output of latch 49 activates a transmission gate 51 to cause the slow sweep signals generated by sweep generator 52 to be passed through such gate. Generator 52 is operated at a much slower rate than sweep generator 20 and is synchronized with the sync oscillator 18 by means of a frequency divider 53 which is reset by signals generated by a pulse generator 54 to cause the divider to count to zero in response to the signal generated on the output of latch 49 and the inverter 55. The fast sweep generator 20 is simultaneously disconnected from the converter 26 by the output of latch 49 as follows:

Latch 49 activates an OR gate 56 which, in turn, activates inverter 28, thereby deactivating transmission gate 27 stopping the passage of fast sweep signals from generator 20 through switch 11B, the output of which extends to the converter 26.

The memory 24 is thus scanned at a slow rate and its contents are read and converted to analog signals by means of the digital-to-analog converter 39 in the manner described. Such analog signals are input to a modulator 57, which combines them with the slow sync pulse received from inverter 55. The combined signals convert the composite video picture signal to a form which may be carried on ordinary telephone lines, such form being for example, an FM signal which is modulated between 400 Hertz and two Kilohertz. The output of modulator 57 is then transmitted to an amplifier 57A through transmission gate 58 and an A.V.C. circuit 59, the function of which is to maintain proper amplification and output level of amplifier 57A. The output of amplifier 57A is applied to drive a speaker 60 which is acoustically coupled to the transmitter 61A of a telephone handset 61, thereby effecting transmission of the visual image signal through the telephone system.

At the beginning of the next sweep sequence, when the entire frame in the memory 24 has been scanned, the pulse generator 48 transfers a second pulse to the input 47B of AND gate 47, which second pulse is subsequently transferred to the clock input 50A of the flip-flop switch 50, which action toggles the Q output 50B to its active state causing a pulse generator 62 to provide a reset pulse to latch 46 and latch 49, thus deactivating input 47A to the AND gate 47 and stopping the passage of subsequent sync pulses through such gate. Transmission gate 51 is also deactivated which stops the passage of slow sweep signals from the generator of 52 therethrough. An input to OR gate 56 is also deactivated, which subsequently causes the input to the inverter circuit 28 to become deactivated, thereby activating the transmission gate 27, resuming the passage of the fast sweep signals from the generator 20 to the analog-to-digital converter 26 and returning the operation of the circuits to the fast sweep mode for again displaying the contents of the memory 24 on the screen of the monitor 42 as described.

Receipt of a short wave transmitted video picture signal is accomplished as follows:

The audible signals emitted by the receiver-microphone 61B of the telephone handset 61, are picked up and converted to electrical signals by means of a microphone or any suitable transducer 63 and are conducted to an amplifier 64 via A.G.C. circuit 65, which maintains a constant volume output for amplifier 64 by varying the gain or other parameter or subsequent application to a demodulator circuit 66. The demodulator circuit 66 outputs the received and demodulated video signal to a sync separator 67. Video signal output 67A of the sync separator 67 is then input to the analog-to-digital converter 23 through a switch 11A, and converted to digital form in the manner indicated above. The sync output 67B of the sync separator 67 serves to set latch 68, the output of which is then applied to activate the input 69A of an AND gate 69 and an OR gate 37, which subsequently activates the write-enable input of memory 24 wherein operation continues as previously described. The other input 69B to the AND gate 69 is activated by the sync pulse received from the sync output 67B of the sync separator 67. When both inputs 69A and 69B are activated, such sync pulse is transferred to the clock input 70A of a JK flip-flop switch 70, toggling its Q output 70B to an inactive state.

The signal generated on the sync output 67B is also conducted through switch 11C to the slow sweep generator 52. The output of the sweep generator 52 is conducted through switch 11B and transmission gate 27 to analog-to-digital converter 26, which functions thereafter as described. The incoming video signal is thus written or recorded in the memory 24 in synchronization with the other necessary signals transmitted thereto.

On receipt of a second sync pulse which marks the end of the received frame signal, such sync pulse is processed and conducted through gate 69 to the clock input 70A of flip-flop switch 70, thus retoggling the Q output 70B of such flip-flop, to the active state and causing a pulse generator 71 to generate a pulse which is applied to reset latches 68 and 72. Latch 72, once set as described, activates an OR gate 56 which causes inverter 28 to inactivate transmission gate 27, thereby stopping the passage of the slow sweep signals from generator 52.

The output signal generated from the output of latch 72 is also applied to activate a transmission gate 73 allowing the passage of the fast sweep signals from the generator 20 to the analog-to-digital converter 26. The memory 24 is thus scanned at the fast rate with subsequent display of the frame recorded in the memory, on a monitor screen 42S as previously described, thus displaying the received information.

When the next full-frame picture signal is received, a third sync pulse is generated on output 67B of sync separator 67 which pulse is transferred to the output of AND gate 69. Such pulse is further conducted through a switch 74 to the reset input of latch 72 which, in turn, deactivates OR gate 56 causing inverter 28 to turn on or activate transmission gate 27, thus passing the slow sweep signals from generator 52 through switch 11B to the analog-to-digital converter 26. The signal generated on the output of latch 72 deactivates transmission gate 73, thus stopping the passage of fast sweep signals from the generator 20, with subsequent recording and sweep speed switching being effected as indicated above.

If manual resetting is desired, the reset input to the latch 72 is connected to a momentary contact, manually operated switch 75 through switch 74 which, when operated, will reset latch 72 with subsequent operation as described.

System 10 may also be operated with a transceiving computer terminal. Information keyed or otherwise generated by means of the selective operation of a keyboard 76, is output in coded form to a suitable modem 77 and thence to an amplifier 57A thru an AGC circuit 59, which subsequently drives speaker 60 which is acoustically coupled to handset 61 as described. The entered information is also transmitted to and recorded by a memory 78 through a switch 79 and therefrom to a character generator 80, a video driver 81 and a switch 41 to display the latter on the screen 42S of the video monitor or receiver 42.

Incoming signals received from handset 61 are converted and amplified by a microphone 63, an AGC circuit 65 and an amplifier 64. The demodulator 82 separates the incoming signals from the modulation and the connected decoder 83 converts such signals to appropriate digital form for application to memory 78 through switch 79. Subsequent thereto, character generator 80 and video driver 81 cooperate to generate video signals representative of the contents of the memory 78 by passing said signals through switch 41 for subsequent display on monitor 42, thereby displaying the received information once more. It is noted that all circuits are synchronized by sweep generator 20.

Power supply 84 supplies suitable electrical power for all its active circuits of system 10 and may comprise a battery or other source of electrical energy. A manual switch 85 connects such power supply to the circuits illustrated and deactivates such circuits when opened.

In FIG. 2 the major components of system 10 of FIG. 1 are illustrated. A self contained unit includes a housing for receiving and retaining all components of the system 10. The self contained unit includes an attache-like case 86 having a pivoted top portion 86A which is hinged to a bottom portion 86B by means of hinges 86C and 86D and is easily openable to expose the operating components of the system. Mechanical latches 86E, 86F, 86G and 86H, are provided to close the case 86 when not in use. A handle 86J is also shown and is included for ease of carrying or transport of the device.

Within the housing 86 is contained mounting panels 87A and 87B on which are supported all of the switches and controls described and defined in FIG. 1.

Additional components and features of the container 86 include a storage compartment 12A in which the television camera 12 may be stored, another compartment 16A for storing light source 16 to be used with the camera, a hinged support 12B for supporting the television camera as system 10 operates, a battery compartment including a cover 84A with a depression 84B for removing the cover allowing access to the rechargable battery, a ribbon cable 88 for connecting circuits devices located within the container with the other components indicated in the schematic diagram and a compartment 61C for containing a telephone handset, such as illustrated in the schematic diagram, in which compartment is disposed the described microphone 63 and speaker 60 in proper position to permit their coupling with the telephone handset mouthpiece and earpiece; a compartment 89 in which is stored a line cord 90 for connecting system 10 to line current, if necessary or for charging the battery 84. A television camera and light extension arm assembly 91 is stored in compartment 89. Also stored within the container 86 are folding devices 91A and 92A for cables and a keyboard 76 supported within a compartment 76A.

FIG. 3 shows an arrangement of the system 10 for transmitting facsimile information, such as document or picture signals, on telephone lines. The television camera and lamp support assembly 93, which contains swivel joints 93A to 93D for adjusting the position of the camera, is fitted into and supported by holder 91A in a manner to support the camera 12 on the end of an arm 91 when a clip 12C, which is attached to the camera, is secured to the support. This positions the camera directly above a support 94S for document 94. The extension 93 also supports the camera floodlight 16 when a clip 16B supported by the light socket, is attached thereto to permit the document to be properly illuminated for proper video camera scanning. An extension cord 16C extends from the recess 16A in which the light source 16 is stored, to such light source when such light source is supported at the end of jointed arm assembly 91 as shown for providing suitable electical energy for power such light source and also contains a pluggable connector 16D at its end to connect it to the light source housing. A second extension cord and cable 16D extends from the recess 12A in which the camera 12 is stored and contains wires for supplying power to operate the television camera and transmit the camera's video output signals to the circuits shown in FIG. 1. Notations 12E and 12F refer to stress relief grommets for the cables 16C and 16D supported by the side walls of the recesses 16A and 12A. Support 94S for the document 94 to be scanned contains a prepositioning frame or stops 94R for prepositioning the document for proper scanning by the video camera 12 when the support 94S is properly located on the panel or cover 84A for the battery compartment by disposing the latter against the side walls of the compartment or container 86B. The television camera 12 may be easily detached from its hinged mount 12B as shown in FIG. 2 to permit it to be retained by its support clip 12C at the proper location on the arm 93 as shown in FIG. 3 for properly scanning a document.

In FIG. 4 is shown an operating arrangement in which the manually operable keyboard 76 is supported outside of the case or container 86 to permit easier access thereto. A holder 92A, which is attached to the rim of the bottom part 86B of the container 86 is operable to receive a holding clip 92B which is attached to the support for the keyboard 76 and to hold the keyboard thereon. Keyboard 76 is electrically connected to system 10 through an extension cord 76B which extends through grommets 76C and 76D in openings the wall portions of the keyboard support and the container 86 as shown.

FIG. 5 shows the system 10 modified or added to for the production of hard copy of information received on a connected telephone circuit from a remote location containing a similar device or from the output of camera 12 and/or the keyboard 76. A hard copy printer 96, such as a facsimile printing device of conventional design, a cathode ray tube printer, a laser line printer, ink jet printer or other device, has as inputs thereto terminals 96A and 96B extending from the sweep generator for the television camera 12 and the picture signal element generator 39, which is the described digital-to-analog converter receiving the picture information elements from the memory 24. Upon closure of a normally open switch 95, signals presented to the terminals of the hard copy printer 96 and the automatic operation of such printer will cause the printer to print and provide a hard copy of the information fed thereto, which hard copy will be delivered as a sheet from a slotted opening 96A provided in the side wall of the upper part 86A of the case or housing 86 in which is contained such hard copy printer.

In the event that it is desired to listen to conversation from the remote terminal without picking up the telephone handset 61 from its operable position in the recess 61C a speaker 60A is provided which is supported by the front panel 87A of the housing section 86A as shown in FIG. 2 and is connected through an audio amplifier 63A and a manually operated switch 63S to the microphone 63 to which the mouthpiece or speaker 61B of the telephone handset 61 is coupled. The bistable manual switch 63S permits the operator or user of the communication device 10 to receive and listen to the voice of the person at the other end of the telephone line after the video signal has been transmitted or before such transmission without removing handset 61 from the cradle or recess 61C provided in housing section 86B. Switch 63S may also be automatically controlled or replaced by a suitable filter circuit and control to pass only audio speech signals to the speaker 60A.

Also provided and supported by the panel 87A at the front of housing member 86A is a microphone 98 which is connected to the amplifier 57A when a manually operated bistable switch 99 is closed to permit the operator of the device 10 to speak directly to a person at the other end of the connected telephone circuit without removing the headset 61 from its cradle position in the recess or cavity 61C. The microphone 98 may be filed to the panel 87A or may be connected to a length of cable to be removable from the recess in the panel in which it is seated and held by hand or on the end of an extendable support near the mouth of the person using the device 10 for communication with a person at a remote terminal circuit of the telephone system to which the device 10 is coupled.

Variations in the system 10 shown in FIGS. 1-5 of the drawings include the following:

I. The television camera 12 and/or its optical system may be pivotally or otherwise supported for multiple axis adjustment of its scanning axis. In other words the scanning axis of the camera may be adjusted in both the horizontal and vertical directions.

II. The television camera 12 may also be supported higher on the compartment 86A than illustrated. It may also be supported on a track or rod extending in the vertical direction and supported by either or both the compartments 86A and 86B, and may be adjustably moved on said track.

III. Additional support may be provided in the form of one or more brackets, slides or legs pivotally secured to the vertically extending compartment or housing member 86A for supporting it vertically on the other compartment 86B as shown in FIG. 2.

IV. One or two axis movement of the television camera 12 may be effected by the operation of one or two motors which may be locally and/or remotely controlled in their operation.

Television camera focus as well as its scanning axis may be motor controlled wherein such motors are operable from the remote telephone terminal circuit by the operator thereat transmitting suitable tone control signals on the connected line to which signals suitable tone responsive relays or the like are responsive for controlling operation of such motors, for remote control of camera focus and scanning axis location or attitude.

V. The folding or pivoted assembly of the compartments 86A and 86B may be replaced by a single right angle structure defining a keyboard horizontal portion supporting a vertical portion thereof containing the video monitor screen and the movably adjustable television camera adapted to scan either the person operating the keyboard or facing the television receiver screen and to be pivoted or employing an optical system for scanning a document disposed on a receiving portion of the horizontal portion for generating the described facsimile signals of documents on the connected telephone circuit. The described hard copy printer may be supported within wither the vertical or horizontal portions of such a structure.

VI. A data composing and automatic transmission system may be provided employing the system 10 wherein the keyboard 76 is manually operated to generate characters which are displayed on the display screen 42S of the monitor 42 as lines of characters and, when a complete page or message has been so composed, it may be automatically transmitted to the remote terminal circuit to which the telephone 61 is connected by the proper operation of switch 41 to cause the displayed information to be read by the read beam of the monitor and transmitted to the input of modulator 57 the output of which is connected as described to provide such information in a transittable form on the speaker 60 coupled to the microphone of the headset 61 of the telephone.

VII. In a modified form of the invention it is noted that the outputs 40 of the memory 24 may extend to respective different frequency or tone signal generators 40 for generating different tone signals of the respective digital signals reproduced from such memory which tone signals may be applied to generate respective tone sound signals on the output of the speaker 60 for receipt and conversion by the microphone 61A of the telephone headset 61 to respective tone signals on the terminal circuit of the telephone to be transmitted to another terminal circuit of the telephone system and to be recorded thereat for use in generating the video information so transmitted as an image on the viewing screen of a television receiver thereat which forms part of an apparatus similar to the system 10 illustrated.

VIII. The video telephone apparatus described requires a similar apparatus or the like at another terminal circuit of the automatic telephone switching and connection system to which it is connected or coupled as described in order to effect two-way video communication and display between two parties. Accordingly such a similar apparatus is assumed to be part of the present system and may be similarly constructed as shown in the drawings and described herein or modified as described hereafter.

IX. System 10 or the modified system described hereafter may be employed to automatically record and forward audio messages in digital form when passed to the analog-to-digital converter 23 and generated by local or remotely generated speech signals on the output of the telephone microphone 61B wherein suitable operator operated controls or speech controlled controls are provided for reproducing such digital speech signals from a memory, such as memory 24, and applying same to an analog-to-digital converter connected to the output of speaker 60 to permit both local listening and remote transmission to be effected on the connected line.

Figure 6:
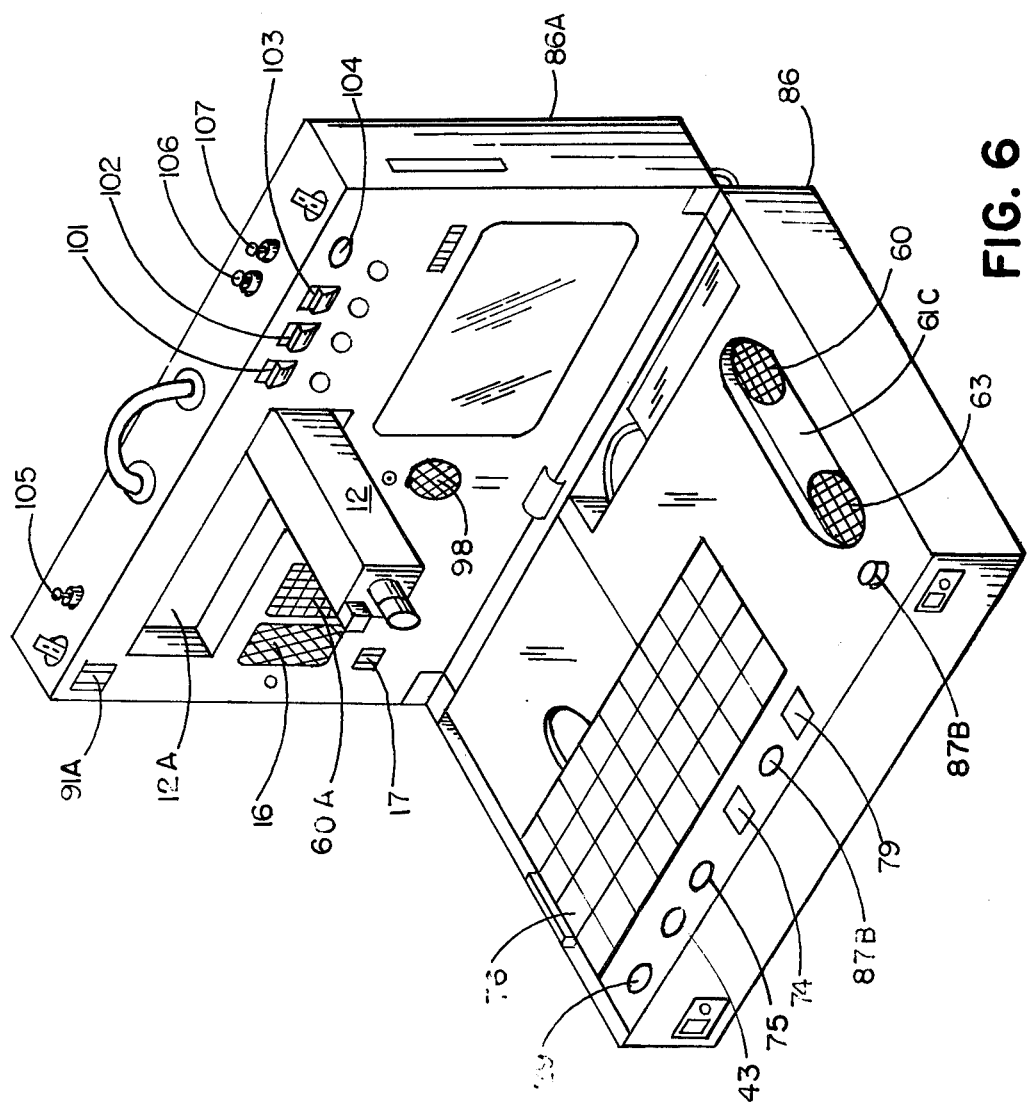
FIG. 6 is an isometric view of a modified form of the portable unit shown in FIG. 2.

In a modified form of the invention which is illustrated in FIGS. 6 and 7 and in part in FIG. 2, video picture information may be sent and received simultaneously on conventional telephone lines together with speech information generated by a person speaking into the telephone microphone connected to the same line wherein a bandwidth is maintained no larger than a single voice channel. These functions are accomplished by inserting blocks of picture or video data on the transmission line when pauses occur during normal voice conversation on the same line. Automatic switching is provided which senses the beginning and the end of such voice pauses and results in the preferred transmission of speech or voice signal data.

In FIG. 6 certain modifications to FIG. 2 have been made to permit the portable video telephone to be utilized for telephone conversation simultaneously as video data is transmitted. The upper or top portion 86A of the housing 86 contains a receive-transmit lockout switch 101, a local-remote telephone switch 102, a television-video phone function switch 103 and an indicator light 104 for indicating a malfunction such as the incomplete reception of video information. Also supported by the top portion 86A of the housing are a television receiving antenna 105, a remote transceiver receive antenna 106 and a remote transceiver transmit antenna 107 for the short wave reception and transmission of video information. Such switches and controls may be incorporated in a carrying unit of the type illustrated in FIG. 2 which, in FIG. 6, is modified to provide the television camera 12 centrally disposed at a higher location on the top housing component 86A and pivotally retractable into a receptacle 12A as in FIG. 2.

Figure 7A:
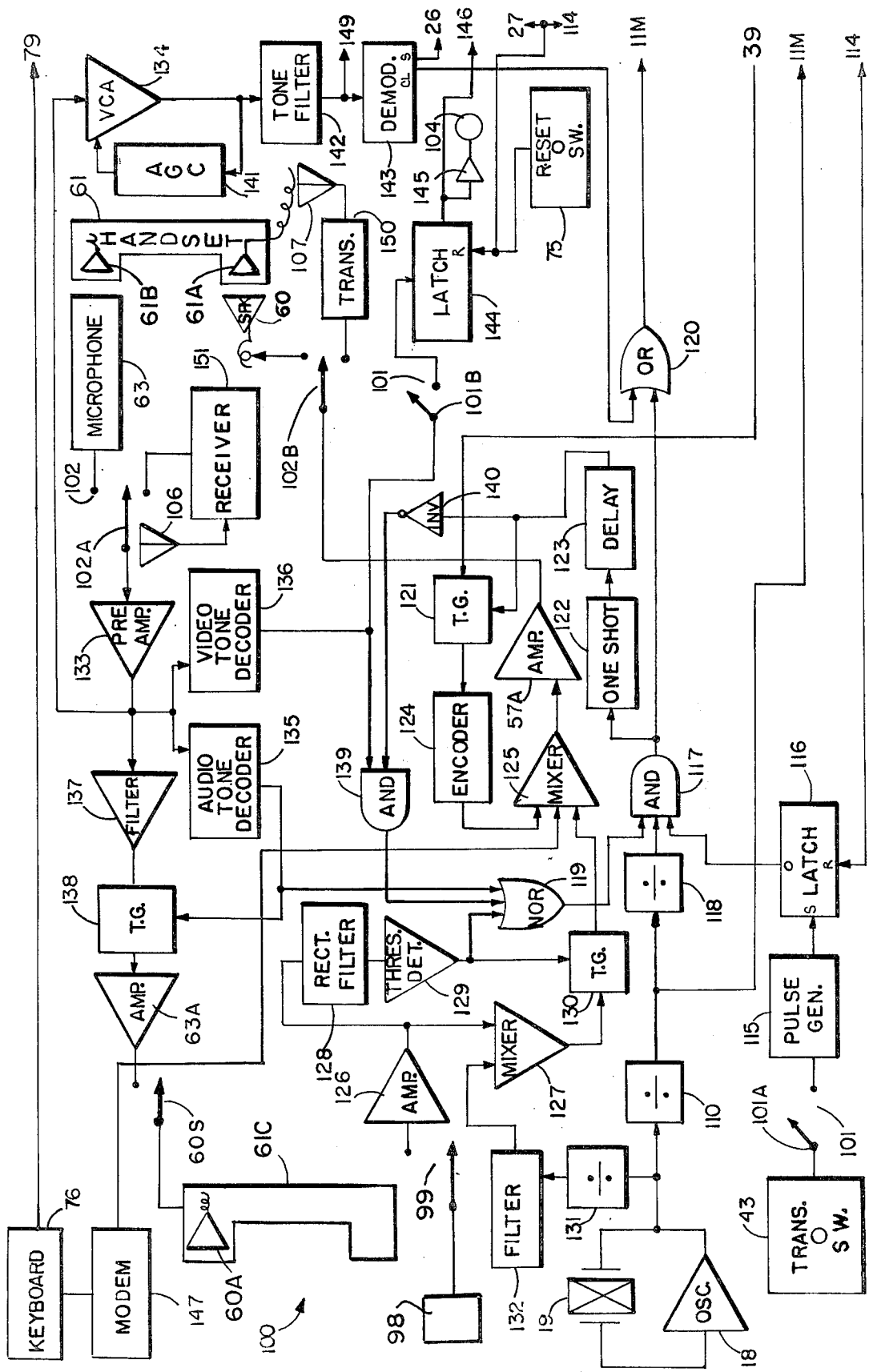
FIGS. 7A and 7B are schematic diagrams of a modified form of the electronic system shown in FIG. 1.
Figure 7B:
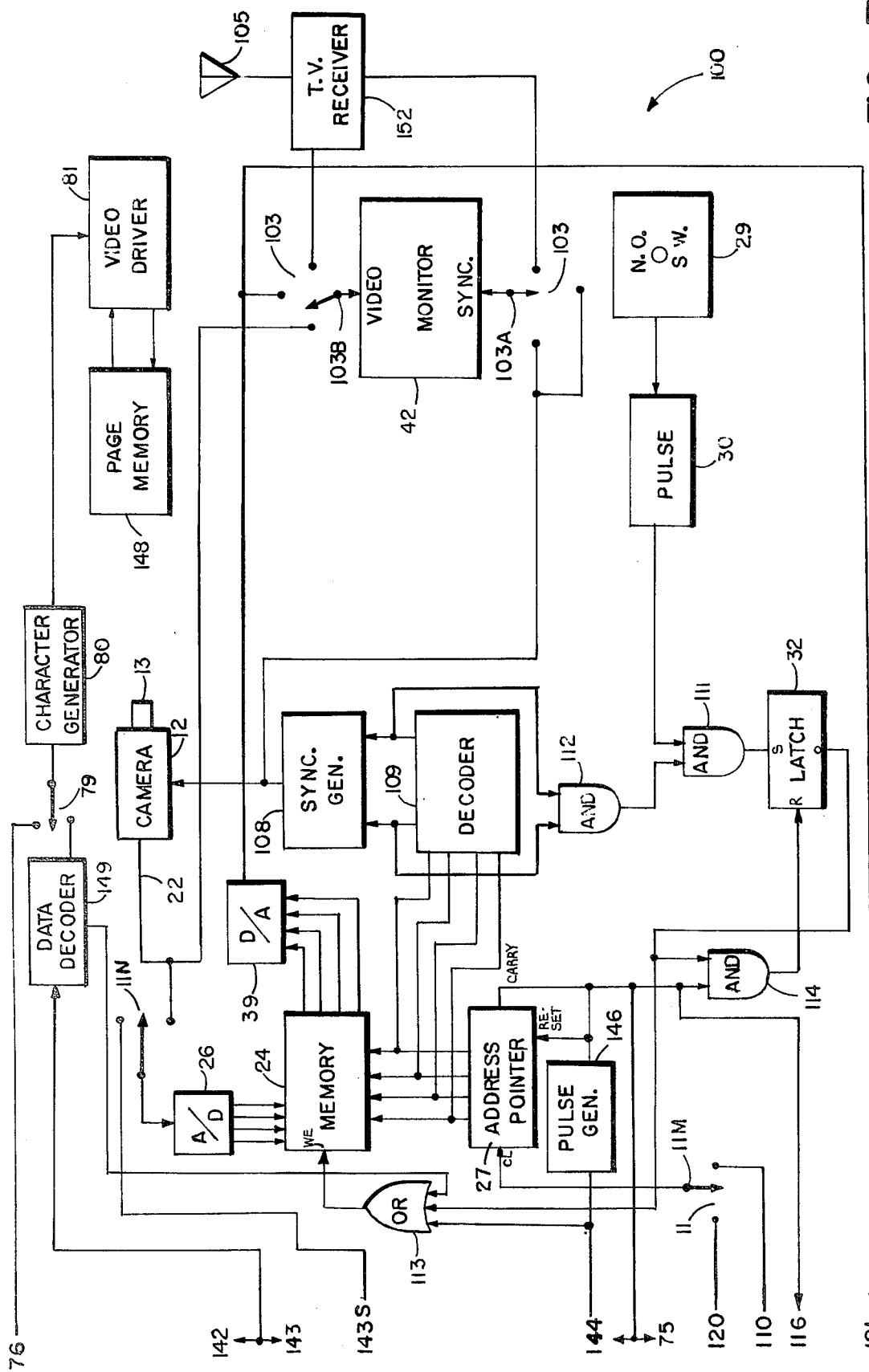

In FIG. 7, the voice-video multiplexing system described above is denoted 100 and includes, as in the system of FIG. 1, a master timing oscillator 18 having a stable, accurate feedback circuit 19 which serves to synchronize all of the functions of system 100. FIG. 7 is shown in two parts, FIGS. 7A and 7B.

VIDEO TRANSMISSION MODE OF OPERATION

With sections 11M, 11N of function switch 11 in the preview-review data [P/R/D] position, system 100 is operating at a high-speed scan mode and may thus be used to rapidly preview video data displayed on the display screen of the video monitor 42. In such mode, the scene or image field of the television camera 12 is scanned at high rate or conventional television frequency. Vertical and horizontal synchronization signals are generated on the output of a sync generator 108 which obtains synchronizing pulses corresponding to the first horizontal line of the frame vertical sync signal and line vertical sync signals as well as horizontal sync signals from the decoder 109 which recognizes the memory position output codes of the address pointer 27 corresponding to the horizontal line positions. Clock pulses cause the address pointer 27 to step through its output codes for effecting full-frame field scanning and are generated by oscillator 18. Such pulses are divided to provide proper scanning frequency by a divider 110 and are passed through switch 11, section 11M thereof, to the clock input of the address pointer 27.

The video signal output 22 of camera 12 is passed through switch 11, section 11N thereof, to analog-to-digital converter 26 where such video signals are converted to digital form and presented to the read-write memory 24 when the write-enable input WE of the memory 24 is activated. The video signal output of camera 12 is conducted through switch 103, section 103B thereof, when such switch is conditioned for effecting the preview function, to the video monitor 42. Also input to the video monitor 42 are sync signals derived from sync generator 108 through switch 103, section 103A thereof. The monitor 42 is thus caused to display data generated by video camera 12.

When the complete picture of the information scanned by the camera is composed, momentary closure of push-button switch 29 will cause pulse generator 30 to pass a pulse of fixed width to one input of an AND gate 111. The other input to AND gate 111 is activated by a signal from an AND gate 112 whenever the latter AND gates senses coincident vertical and horizontal sync pulses at the output of a decoder 109, a condition indicating the generation of a new full-frame of video information on the output of the camera. The output of the AND gate 111 sets latch 32, the output of which is passed through an OR gate 113 to the write-enable input of memory 24, thus initiating the recording of the presently generated video picture frame signal into memory 24. Whenever latch 32 is set, its output also activates one input of an AND gate 114, the other input of which is activated by the carry-out output of address pointer 27 which is activated only when the memory 24 is completely filled, indicating that the pointer 27 has reached its maximum count. When both inputs to AND gate 114 thus become activated, a pulse is conducted to the reset input of latch 32, deactivating the output of such latch and also deactivating the write-enable input to memory 24 through OR gate 113, thereby completing a picture-memory recording sequence. Such sequence of switching functions are repeated as many times as a frame of video information has been stored in the memory.

The information stored in the memory 24 may be reviewed by selectively operating switch 103 to the review mode. In this mode, the video monitor is connected to the output of digital-to-analog converter 39 instead of to the television camera 12. The monitor 42 thus displays the video information stored in memory 24.

In order to transmit the selected video information or frame to the remote telephone terminal, the operation of the system need not only set switch 11 to the transmit-receive [T/R] mode and momentarily activate transmit switch 43. A pulse which is indicative of such activation, is then transferred through transmit-receive interlock switch 101, section 101A thereof, to a pulse generator 115, which in turn passes a pulse to the set-input of a latch 116. Switch 101 serves to prevent the reception of video picture signals from the remote terminal during the transmission of video data and the transmission of video information during reception of such remotely generated video picture information. When set, the output of latch 116 activates one input of an AND gate 117, a second input to which AND gate is a slow-scan clock frequency signal output by a divider 118. A third input to the AND gate 117 is obtained from the output of a NOR gate 119 which is generated when all inputs to gate 119 are inactive, a condition which will be described hereafter. When all three inputs to AND gate 117 are present thereat, a clock pulse is generated and passed from divider 118 through OR gate 120 and mode switch 11, section 11M thereof, to the clock input of address pointer 27. Such clock pulses cause sequential access of signals contained in memory 24 which are representative of each pixel of the picture field defining the frame of information stored in such memory. Such pixel information is converted to analog form by digital-to-analog converter 39 and the resulting analog signal is passed to the input of a transmission gate 121, the output of which gate extends to a slow-scan video encoder 124.

The output of AND gate 117, when activated, causes a pulse to be generated by a pulse generator 122 which pulse is transferred to the control input of transmission gate 121, after a suitable delay effected by means of a time delay circuit 123, thereby allowing the video picture signal information which is input to the transmission gate 121 to be transferred to the slow-scan video encoder 124. The encoder 124 converts the video information to a form acceptable for audio frequency transmission, such as amplitude modulated or frequency modulated signal information, and passes such encoded video signals together with a tone or code signal indicative of video transmission, to an audio frequency signal mixer 125, through which mixer such signals are passed to amplifier 57A where they are amplified and applied to drive the loud speaker 60 which is acoustically coupled to the hand set 61 as previously described.

When the full frame of video information recorded in memory 24 has been reproduced and the address pointer 27 counts one or more clock pulses past the last memory addressed, the carryout output of the pointer 27 becomes active causing the latch 116 to be reset and thereby ending the transmission of picture signal information by deactivating AND gate 117.

System 100 is designed to automatically multiplex audio speech signals and video picture signals on the connected telephone line as follows. Sounds of speech are sensed by microphone 98 and converted to electrical analog signals on its output and then passed through a switch 99 to an audio amplifier 126, the output of which is passed to an audio mixer 127 and a filter 128. The output of filter 128 is monitored by a threshold detector 129. Whenever the output level of filter 128 exceeds a preset threshhold level, threshhold detector 129 activates the control input of a transmission gate 130 and one input to NOR gate 119 which causes the output of such NOR gate to become deactivated, thereby deactivating the output of AND gate 117 and stopping the passage of clock pulses to address pointer 27, thus terminating video signal transmission in order to allow for uninterrupted voice signal transmission on the connected line. The voice or speech signal is combined in audio mixer 125 with a stable accurate tone signal indicative of voice transmission. Such tone signal is derived from oscillator 18 and is converted to an audible frequency by a divider 131 and is then filtered to an acceptable wave shape for telephone transmission, by means of a filter 132. The combination voice-tone signal is passed through transmission gate 130 whenever the control input to such gate is activated and is then conducted to one input of audio mixer 125. The combined signal is then amplified by an amplifier 57A and passed through a switch 102B to speaker 60 for acoustic coupling.

Upon cessation of speech input to the microphone 98 such as during a pause in speaking, and the cessation of speech signals with an amplitude greater than a preset threshhold, the output of threshhold detector 129 becomes deactivated, thus automatically returning operation of system 100 to that previously in effect prior to vocalization or audio signal generation on the output of the microphone 98.

In a similar manner, incoming speech signals received from a remote terminal, may be utilized to automatically halt the transmission of video picture signal information in the form of signals generated. Assuming that such incoming speech signals have been processed by a system similar to system 100 at the remote terminal connected to the terminal to which system 100 is connected and that the incoming speech signal contains the above mentioned voice indicating tone signal, such incoming speech signal is converted to sounds of speech through the speaker of the telephone handset and then transduced, as described to representative electrical signals by microphone 63, which electrical signals are transferred through switch 102, section 102A thereof, to the input of a preamplifier 133, the output of which forms the input to a voltage controlled amplifier 134, a voice tone decoder 135, a video tone decoder 136 and a notch filter 137. Whenever a voice signal is present on the incoming line, the tone which accompanies such signal is sensed by voice tone decoder 135, thus activating both the decoders output which serves two functions. Activation of such output activates one input to NOR gate 119 which halts the passage of clock pulses from divider 118 to address pointer 27 as described. Output from decoder 135 also activates the control input of a transmission gate 138 which allows the passage of the described speech electrical signals from the notch filter 137 to the amplifier 63A. Amplifier 63A amplifies the received signals and passes same through switch 60S to speaker 60A to provide audible speech sounds from the remote terminal. Notch filter 137 sharply attenuates the voice tone accompanying the speech signals while passing the remainder of the audio spectrum so that the tone will not be objectionable upon audible reproduction. Thus, suitable voice priority multiplexing of speech and video signals received is accomplished.

Also provided is a control means which prevents the transmission of a video signal to a remote telephone circuit while another video signal is being received therefrom. This function is accomplished under the control of a tone signal indicative of a remotely transmitted video signal which accompanies such video signal. Such tone signal is sensed by a video tone decoder 136, the output of which forms one input to an AND gate 139, the other input to which AND gate is normally held active by an inverter 140. AND gate 139 activates one input of NOR gate 119 whenever a video signal is being received. NOR gate 119, when activated, functions as previously described to inhibit video transmission. The output of inverter 140 becomes inactive only when system 100 is transmitting picture information. Thus system 100 is prevented from sensing its own video signal transmission and thereby deactivating or terminating such video transmission as controlled by AND gate 139 and NOR gate 119.

Slow scan video reception is accomplished as follows: Acoustical video signals are picked up by microphone 63 and converted to analog speech electrical signals which are passed to preamplifier 133 through switch 102, section 102A thereof and are then amplified and further amplified by means of voltage controlled amplifier 134 and its automatic gain control circuit 141 holds the signal strength at approximately the same level during the time reception and transmission is effected so that variations in signal transmission caused by noise and other line variations, do not interfere with the operation of system 100. The output of voltage controlled amplifier 134 passes through a notch filter 142 which remove the video indicating tone from the signal and which passes the stripped signal to a video decorder 143 where it is demodulated and decoded and the clock signal is separated therefrom. The incoming clock signals are passed through OR gate 120 and switch 11, which is in the transmit-receive condition for this mode of operations, section 11M thereof, to the clock input of address pointer 27, thereby allowing such pointer to sequentially address each memory cell in the memory 24. The video portion of the received composite signal is transferred through section 11N of switch 11 to analog-to-digital converter 26 which converts the signal to representative digital signals which are presented to the write-input terminals of memory 24 for recording therein.

When video signals are received, the video tone decoder 136 becomes active and the output thereof is passed through a receive-transmit interlock switch 101, section 101B thereof, to the set input of a latch 144, the output of which turns on or activates a lamp driver 145 which drives an indicator lamp 104 to indicate that picture information is currently being received. Also driven by the output of latch 144 is a pulse generator 146 which generates a reset pulse and applies same to the address pointer 27. One input of an OR gate 113 is also driven by latch 144 causing the write-enable input to the memory 24 to become activated. The reception of video information continues until the entire full-frame video picture signal has been received and the carry-out output of the address pointer 27 again becomes activated which serves to reset the latch 144 and extinguish the indicator lamp 104 as well as to deactivate the memory-enable input to memory 24 through OR gate 113. To view the received image information, the operator of system 100 operates switch 11 to a preview-review position which automatically switches system 100 to a fast-scan mode and immediately causes the monitor to display the digitally encoded pixels contained in memory 24, thus completing a cycle of receive-mode operation.

Memory 24 and all the described transmission-reception latches may be reset at any time by the momentary manual activation of reset switch 75 which creates a reset pulse and applies same to all of the pertinent devices and circuits.

It is noted that system 100 may also be utilized as a remote computer input-output terminal. A digitally encoded keyboard 76 is provided having finger operated keys which are encoded for audio frequency transmission, by means of a data encoder 147, the output of which is transmitted through an audio mixer 125 to amplifier 57A and switch elements 102B to the speaker 60 to effect acoustic coupling with the microphone 61B of the telephone handset. Such data may also be displayed on the monitor 42. Such keyboard generated digital code signals pass through a data-preview control switch 79 when manually operated to the preview position to a character signal generator 80 and such character generating signals are recorded in page or frame memory 148, an electronic buffer employed to refresh the video driver 81 which operates to maintain the still image on the display screen of the video monitor by means of the character generating signals and the synchronizing video signal components fed thereto from sync generator 108.

When it is desired to receive data, such as graphical or character data, acoustical signals representative of such data as received by the telephone to which the portable video telephone is coupled, are picked up by the microphone 63, amplified by preamplifier 133 and voltage controlled amplifier 134 and input to a data decoder 149 which demodulates and decodes such input signals and outputs same through switch 79, when the latter is in the received switching condition, to character generator 80, which operates as described to preview data entered or generated by means of the local keyboard. Also output by the data decoder 149 is a flag signal which activates one input to OR gate 113 whenever data is received. Thus the input data is also recorded in memory 24, since the enable input to such memory is activated by the output of OR gate 113, and may be stored for later use in monitoring or printing such data.

System 100 is also designed to be operable as a data transmitting and receiving terminal without the use of a telephone switching system as a communication system. If switch 102 is in a remote control position, signals which normally are transmitted to speaker 60 are directed to a short wave transmitter 150 which is connected to a short wave transmitting antenna 107 through section 102B of switch 102 and signals normally derived from microphone 63 are picked up by an antenna 106 and transmitted to a short wave receiver 151 which is connected through switch section 102A to preamplifier 133 wherein system 100 thereafter operates as hereinbefore described. For operation in such mode, handset 61 is not placed in the cradle 61C but is disposed in a special cradle located at a remote station as described hereafter.

System 100 is also designed to be capable of receiving standard television signals which are broadcast from a remote broadcast station. Sections 103a and 103b of switch 103 are operable to switch the video and sync inputs respectively to a standard television receiver circuit 152 and its attendant antenna 105.

Figure 8:
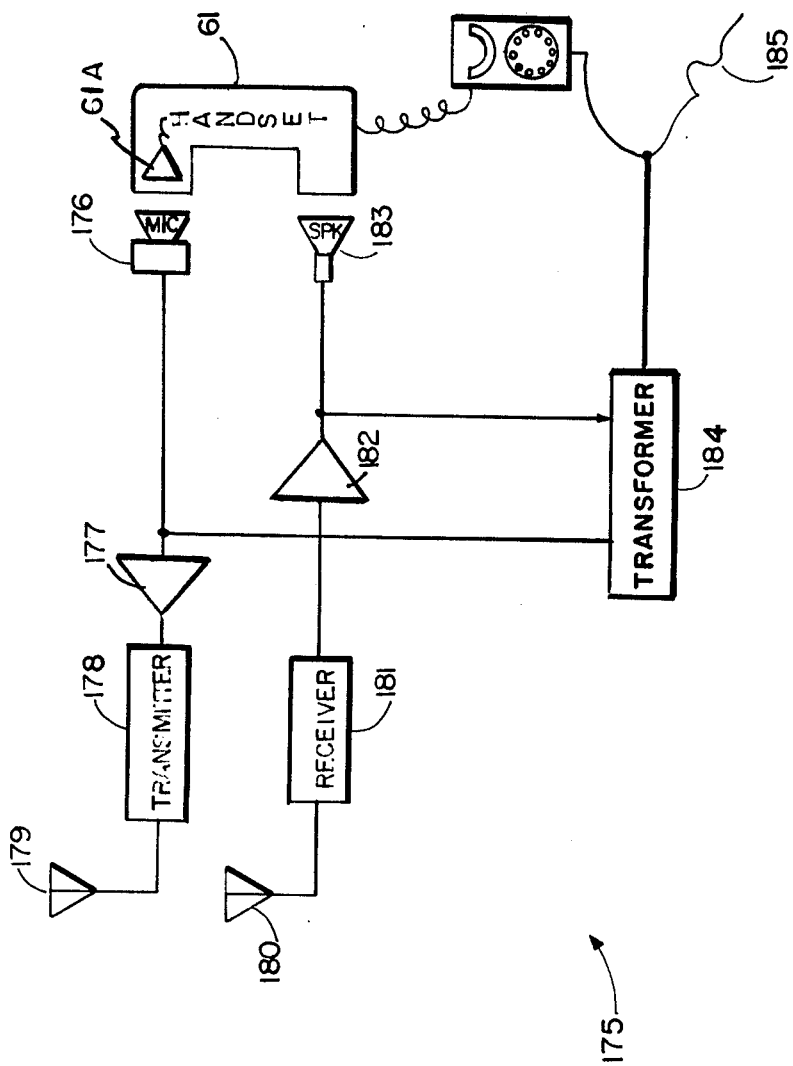
FIG. 8 is a schematic diagram of an electronic subsystem employed to make a direct connection between the system of FIGS. 7A and 7B and a telephone line and also illustrates a remote transceiver for use with the system of FIGS. 7A and 7B.

In FIG. 8 is shown details of a remote transceiving subsystem 175 for use with system 100, which may be located in the vicinity of any telephone of a telephone switching system. Acoustic signals or sounds of speech generated by the speaker 61A of the telephone handset 61 are picked up by a microphone 176 and are converted thereby to analog electrical speech signals which are amplified by an amplifier 177, the output of which is connected to a short wave transmitter 178 for transmitting such speech information on a short wave antenna 179 to the receiving antenna 106 of system 100. The received signals are thereafter processed and utilized as described above in the description of the operation of FIG. 7. The signals transmitted by the antenna 107 of system 100 are received by a short wave receiving antenna 180 forming part of the transceiving system 175, converted to electrical signals which are amplified, selected and demodulated by a short wave receiver 181 which is connected to the antenna 180. Such signals are amplified further by an amplifier 182, the output of which is applied to drive a speaker 183 which is acoustically coupled to the microphone of a handset 61.

FIG. 8 also illustrates means for effecting a direct connection between the subsystem 175 and the telephone line 185. Such connection is accomplished by means of an isolation transformer 184 which receives signals which may be otherwise applied to speaker 183, and derives signals from the telephone line which would otherwise be applied to microphone 176.

We claim:

1. A method of generating, transmitting and receiving picture and speech information comprising:

effecting a telephone circuit connection between first and second telephone terminal circuits of a telephone switching system, generating a first video signal, storing said first video signal in a first memory located at said first telephone terminal circuit, reproducing a first part of said first video signal from said first memory, converting said first portion of said video signal to a form whereby it may be transmitted on the telephone circuit connecting said first and second terminal circuits and transmitting information defining said first portion of said video signal between said first and second terminal circuits, receiving the transmitted signal at said second terminal circuit and converting same to digital form and recording such digital signals in a first portion of a second memory, initiating speech communication between said telephone terminal circuits by speaking a first word into a microphone at said first telephone terminal circuit and converting the sound thereof to a first speech signal, detecting said first speech signal and generating a first control signal and utilizing said first control signal to interrupt the reproduction of said video signal from said first memory, electrically detecting when said first speech signal terminates and generating a second control signal and employing said second control signal to reinstitute reproduction of said video signal from said first memory, and repeating said aforesaid procedure each time a speech signal is generated and detected on the output of said microphone until the complete video signal has been reproduced from said first memory to permit the entire video signal to be reproduced therefrom and recorded in said second memory, and when said video signal is recorded in its entirety in said second memory, controlling the reproduction of said video signal and applying same in a manner to generate a full frame of visual video information on the viewing screen of a video monitor.

2. A communication system comprising in combination:

an automatic telephone switching and connection system, first electrical circuit means at a first terminal circuit of said telephone system including a first television camera, a first video monitor, a first erasable signal recording memory, a first analog-to-digital conversion means, a microphone and speaker for two-way voice communication with a second terminal circuit of said system, means for transmitting information generated on the output of said first television camera on the line connection between said first terminal circuit and said automatic telephone system, first control means for causing said first television camera to scan its field and to generate a video signal, said first analog-to-digital conversion means connected to receive said video signal and to pass digitized video signals derived therefrom to said first memory for temporary storage therein, second control means for controlling the reproduction of digital video signal information recorded in said first memory, means for detecting speech signals generated on the output of said first microphone when a person speaks into said first microphone, control means connected to said detection means for controlling said second control means to temporarily terminate reproduction of the video signals recorded in said memory when speech signals are detected and are being transmitted on the connected line whereby portions of the video information stored in said memory may be generated and transmitted through said telephone system to a receiving terminal circuit of said system between speech signals generated on said line to prevent interference between said video signals and speech signals generated, second electronic circuit means similar in construction and function to said first electronic circuit means at a second terminal circuit of said telephone switching system and including a second television camera, second analog-to-digital conversion means connected to the output of said television camera, a second erasable memory, a microphone, speaker means and means for effecting two-way video and audio communication with said first electrical circuit means of said first terminal circuit when said first and second terminal circuits are connected together through said automatic telephone switching system, third control means forming part of said second electrical circuit means for controlling the recording of video information in said second memory until a full frame of video information has been recorded, fourth control means for effecting reproduction of a full frame of video information from said second memory after a full-frame recording has been effected of video signals received from said first terminal circuit and applying said full frame of video information to cause said second monitor to display a full frame of video information as a still image.

3. A system in accordance with claim 2 including a second television camera located at a second terminal circuit of said system and control means as described at said second terminal circuit for effecting two way audio and video communication between said first and said second terminal circuits including means detecting speech signals transmitted in both directions on the connected circuit and controlling the transmission of video signals in two directions between said two terminal circuits to occur between bursts of audio signals to grant priority to speech information transmitted on the connected circuit.

4. Video-audio communication apparatus comprising in combination:

a housing, first means supported by said housing for receiving and predeterminately positioning a telephone mouth-earpiece containing a microphone and speaker, and a telephone therefore connected to a telephone switching and connection system, microphone and speaker means supported adjacent said first means and located to be respectively acoustically coupled to the speaker and microphone of the telephone when said telephone is predeterminately located and supported by said first means, a television camera having an output connected to said speaker means and directed to scan and generate picture signals of an area adjacent said housing, means for initiating and effecting automatic control of the read means of said television camera and generating a video picture signal on the output of said camera and means for applying video signals generated by said television camera to scan its field to said speaker means supported adjacent said first means whereby said speaker means is modulated with video picture signal information and generates sounds in the vicinity of the microphone defining the mouthpiece of the telephone mouth-earpiece supported by said first means, which sounds are converted by the microphone of the telephone to electrical signals capable of being transmitted from said telephone to a terminal circuit of the telephone system, to which terminal circuit the telephone is connected, and the television receiver supported by said housing and having an input connected to said microphone means supported adjacent to said first means for receiving signals generated when the speaker defining the earpiece of the telephone mouth-earpiece is modulated with a video picture signal transmitted thereto on a telephone circuit extending from another terminal circuit of the telephone system and which other terminal circuit such video picture signal is generated.

* * * * *